United States Patent
Lemmon et al.

(10) Patent No.: US 6,474,724 B2
(45) Date of Patent: Nov. 5, 2002

(54) VEHICLE PILLAR HAVING AN INTERIOR PROTUBERANCE AT THE ROOF HEADLINER

(75) Inventors: Joseph G Lemmon, Chesterfield, MI (US); Rajkumar Rajagopalan, Farmington Hills, MI (US); Jennifer A Head, Orion, MI (US); Catherine Oddo-Long, Rochester, MI (US); Shawn R Williams, Auburn Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/106,711

(22) Filed: Mar. 26, 2002

(65) Prior Publication Data

US 2002/0135206 A1 Sep. 26, 2002

Related U.S. Application Data

(60) Provisional application No. 60/278,794, filed on Mar. 26, 2001.

(51) Int. Cl.[7] .............................................. B62D 25/04
(52) U.S. Cl. ..................... 296/189; 296/39.1; 296/214; 280/748
(58) Field of Search ................................ 296/189, 39.1, 296/214; 280/751, 748

(56) References Cited

U.S. PATENT DOCUMENTS 6,315,350 B1 * 11/2001 Nakane et al. .............. 296/189

FOREIGN PATENT DOCUMENTS

JP 5-105007 * 4/1993

* cited by examiner

*Primary Examiner*—Joseph D. Pape
(74) *Attorney, Agent, or Firm*—Ralph E. Smith

(57) ABSTRACT

An impact energy absorbing arrangement is provided for a vehicle interior having a protuberance designed and configured as part of an interior surface covering a vehicle pillar and butting into a headliner surface. The protuberance is arranged so that if an occupant's head forcibly strikes the roof headliner directly above the pillar, the protuberance on the pillar surface would absorb at least a portion of the impact force as well as minimize potential rotation of the head about the occupant's neck by being positioned so as to contact a portion of the occupant's head at approximately the same time as contact would occur with the headliner.

3 Claims, 3 Drawing Sheets

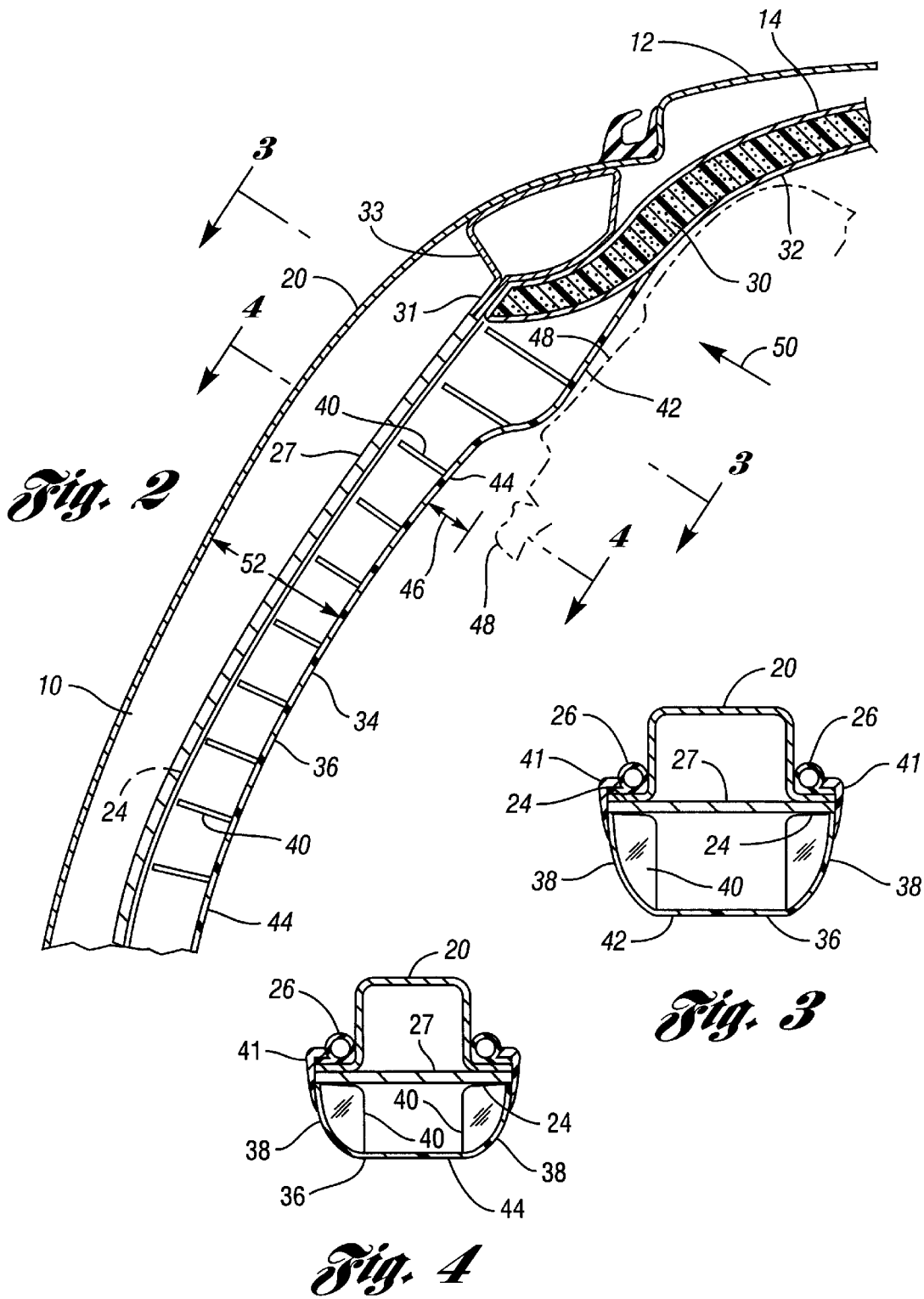

VEHICLE PILLAR HAVING AN INTERIOR PROTUBERANCE AT THE ROOF HEADLINER

This application claims the benefit of U.S. provisional application Ser. No. 60/278,794, filed Mar. 26, 2001.

BACKGROUND OF THE INVENTION

1. Field of the Invention

The present invention relates to a vehicle pillar construction, and more particularly, to an improved occupant impact/energy absorbing arrangement for a vehicle pillar.

2. Background Art

Generally, many areas in a vehicle interior are now designed so as to function as both a finish cover surface for the vehicle and an impact energy absorbing surface if impacted by an occupant during a crash or emergency braking situation.

An area of particular concern is the portion of the vehicle interior where a pillar, such a B pillar, interfaces with a vehicle's headliner. More specifically, if an occupant's head were to impact the vehicle interior in this region, contact would likely be initiated with the headliner first, then with an energy absorbing treatment located over the pillar. This initial contact with the headliner can cause the occupant's head to rotate about the neck during impact. This rotation can subsequently cause an unwanted acceleration of lower portions of the head into the pillar.

Accordingly, a need exists for an impact energy absorbing arrangement that can be used with a vehicle pillar that mitigates such rotation of an occupant's head upon contact with the headliner.

SUMMARY OF THE INVENTION

In accordance with one aspect of the present invention, a protuberance is designed and configured as part of an interior surface covering a vehicle pillar and butting a headliner surface so that if an occupant's head were to forcibly strike the roof headliner directly above the pillar, the protuberance on the pillar surface would absorb at least a portion of the impact force as well as minimize potential rotation of the head about the occupant's neck by being positioned so as to contact a portion of the occupant's head at approximately the same time as contact would occur with the headliner.

In accordance with another aspect of the invention, an impact energy absorbing arrangement is provided for a vehicle interior, the vehicle including a relatively soft, energy-absorbing, roof headliner, and a pillar extending downwardly from the vehicle roof to partially define a front door opening and a rear door opening, wherein the energy absorbing arrangement includes a molded hard-surfaced plastic interior trim panel secured to the vehicle pillar so as to face a vehicle interior space. The trim panel includes an upper portion in edge contact with an exposed surface of the headliner, and a lower, vertically extending portion. The upper portion includes an impact absorbing surface, and the lower portion includes a impact absorbing surface. The upper impact surface is inwardly offset from the lower impact surface toward an occupant of the vehicle to form an upper protuberance in the trim panel extending to the headliner as a smooth continuation of the headliner exposed surface. This allows the upper contact surface to contact an occupant's head at approximately the same time as contact with the headliner would occur, thereby minimizing rotation of the head and acceleration of a lower portion of the head into contact with the pillar or lower impact surface.

The invention will become more apparent from the attached drawings and description of an illustrative embodiment of the invention.

BRIEF DESCRIPTION OF THE DRAWINGS

FIG. 2 is a longitudinal sectional view taken through the vehicle pillar on line 2—2 in FIG. 1;

FIG. 3 is a sectional view taken on line 3—3 in FIG. 2;

FIG. 4 is a sectional view taken on line 4—4 in FIG. 2; and

DESCRIPTION OF A PREFERRED EMBODIMENT OF THE INVENTION

Pillar 10 is located between the vehicle windshield (not shown) and vehicle rear window (not shown), so as to subdivide the vehicle side wall into a front door opening 16 and rear door opening 18. Pillar 10 is sometimes referred to as the B pillar by people in the automotive industry.

Figure 1:
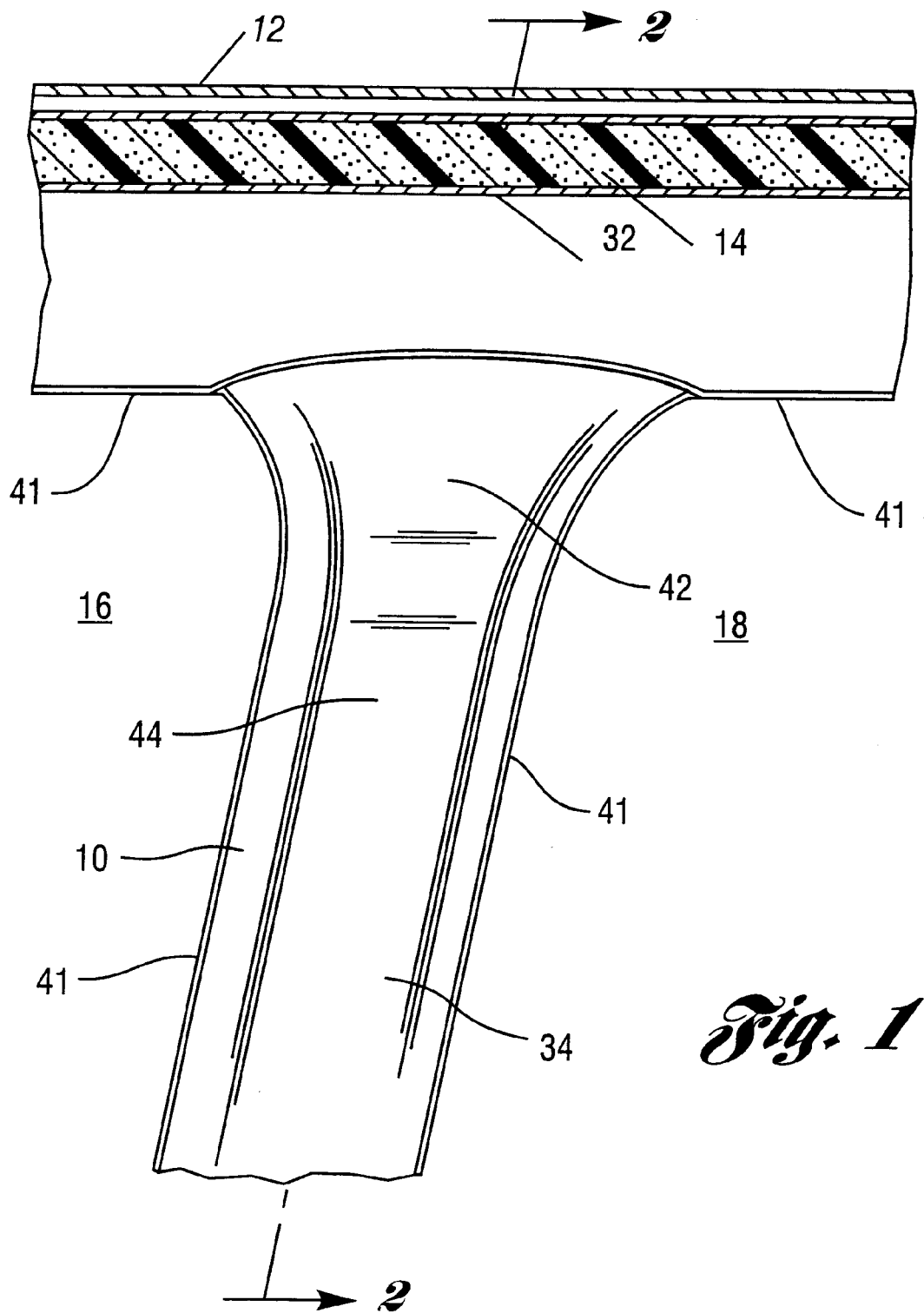
FIG. 1 is a fragmentary elevational view of a vehicle pillar embodying the invention, taken from a point within the vehicle.

FIG. 1 is taken from a point inside the vehicle approximately in line with the backrest of the front seat. Pillar 10 is located on the passenger side of the vehicle. However, the invention can also be employed on the other B pillar located on the vehicle driver side.

FIGS. 2 through 4 illustrate specific structural features that can be used in practice of the invention. As shown, pillar 10 comprises an outer structural member 20 integral with roof 12. Typically, pillar member 20 and roof 12 are part of a sheet metal stamping that forms a major component of the vehicle body. As shown in FIGS. 3 and 4, structural member 20 has a channel cross section having laterally extending flanges 24 for mounting elastomeric weatherstrips 26. The associated vehicle doors are not shown in the drawings. For strengthening purposes, a steel plate 27 may be welded to flanges 24, such that the structural portion of the pillar has a box cross-section.

Headliner 14 may be of conventional construction, that typically includes a relatively stiff backing sheet 28, soft resilient foam layer 30, and ornamental cloth covering 32. The headliner constitutes a relatively soft, energy-absorbing liner for the vehicle roof; in the event that a vehicle occupants head would forcibly strike the lower exposed surface of the headliner some of the impact force would be absorbed or dissipated in the headliner.

Side edge areas of the headliner are supported on metal side rails 33 that are flanged, as at 31, to form support surfaces for portions of the weatherstrips 26 that go along the upper edges of door openings 16 and 18. Rails 33 are welded to the vehicle body to act as stiffeners, per conventional practice in the automotive vehicle industry.

The interior surface of pillar 10 is covered by a hard-surfaced covering that includes an upper interior trim panel 34. Under conventional practice trim panel 34 is a molded, hard-surfaced, plastic member having a channel cross-section. As shown in FIGS. 3 and 4, the trim panel channel cross section includes a web or impact surface 36 and two flanges 38, 38 extending from the web toward the structural pillar member 20. Web 36 has an exposed surface facing the vehicle interior space. Internal ribs 40 are spaced along the length of the trim panel for reinforcing purposes.

Trim panel 34 can be secured to structural member 20 in various ways. As shown in FIGS. 3 and 4, the securement mechanism includes two ornamental attachment strips 41 formed of a flexible plastic material, whereby each strip can follow the curvatures taken by the side surfaces of trim panel 34 and the lower edges of headliner 14. FIG. 1 shows a curving condition that a representative attachment strip 41 can assume.

The present invention is concerned particularly with the configuration of trim panel 34, especially the upper portion of the trim panel. As shown in FIG. 2, the upper portion of the trim panel has a first web or impact surface 42 that is offset from a second web or impact surface 44 that defines the major trim panel surface facing the vehicle occupant. In FIG. 2, the offset is denoted by numeral 46. In an exemplary emmbodiment, offset distance 46 measures about ten millimeters, and the length of web surface 42 (as measured in the plane of the paper in FIG. 2) is approximately seventy millimeters.

Web surface 42 forms a protuberance that extends upwardly to form a joint with the exposed surface of headliner 14. As shown in FIG. 2, web surface 42 forms a smooth downward continuation of the headliner surface.

In FIG. 2, there is fragmentarily shown (in phantom) a human head 48 in a position where it might strike headliner 14 during a crash situation. Arrow 50 denotes a direction that the human head might take in such a situation. The protruding web surface 42 is angled or oriented so that when the human head strikes headliner 14 it simultaneously strikes web surface 42. Web surface 42 absorbs part of the impact force, so that the force is diffused or diluted. More particularly, web surface 42 prevents the human head from pivoting (or swinging) relative to the human neck.

Figure 5:
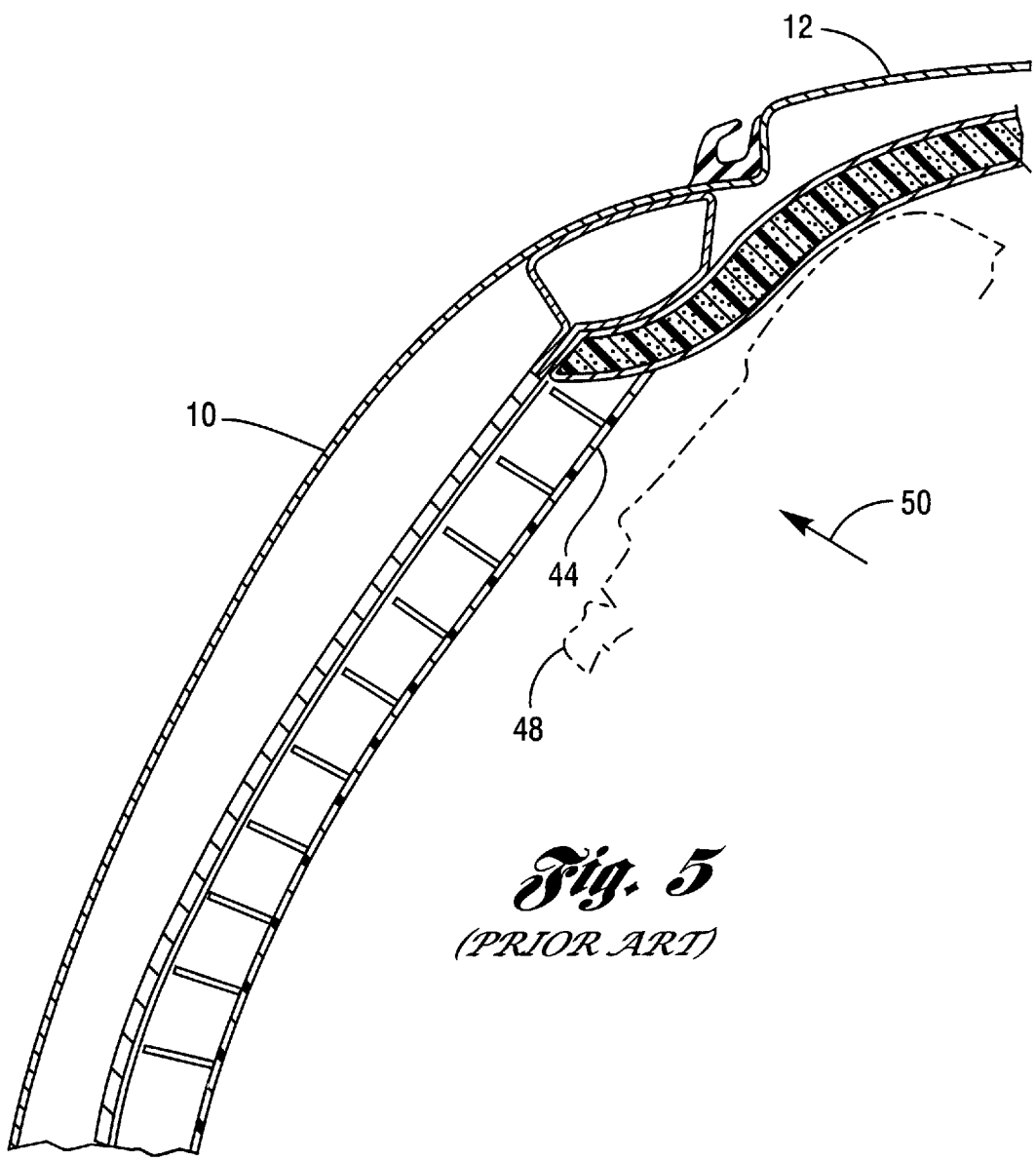
FIG. 5 is a sectional view taken in the same direction as FIG. 2, but showing a corresponding prior art arrangement.

For comparison purposes, there is shown in FIG. 5, a generally similar prior art arrangement that lacks the protuberance provided by web surface 42. As shown in FIG. 5, web surface 44 is continued upwardly to the upper edge of the trim panel. With the FIG. 5 arrangement, any fast motion of the human head in the arrow 50 direction will cause the head to initially strike the headliner (without striking web surface 44). The reaction force will cause the head to tilt in a clockwise direction, so that the person's chin and nose area accelerate against web surface 44 with considerable impact force.

Instrumented testing, using simulated (plastic) heads, indicates that impact forces and deceleration rates are measurably greater with the prior art (FIG. 5), as compared to the herein proposed arrangement (FIG. 2). The measured differences are attributed primarily to the fact that with the FIG. 5 arrangement the head tilts clockwise on initial impact, so as to accelerate the lower chin onto the trim panel surface.

The drawings show the human head impacting the headliner and trim panel along the frontal face area of the head. It will be appreciated that in real life situations the side surface of the head could be the impacted surface, depending on the particular circumstances.

It should be noted that the impact reduction action is achieved without increasing the overall (nominal) thickness dimensions 52 of the pillar. The pillar thickness is dictated largely by the thickness of the associated door, such that the inside and outside surfaces of the pillar are generally coplanar with the corresponding surfaces of the doors.

The present invention achieves a potential head injury reduction feature without changing the overall thickness dimension of the door.

The drawings show the major features of a pillar construction embodying the invention. It should be realized that in practice some additional structural features might be included, e.g. a mechanism for attaching or guiding a seat belt, or a mechanism for storing a safety airbag (within the trim panel 34). Some variations in structure and/or arrangement can be made while still practicing the invention.

What is claimed is:

1. An impact energy absorbing arrangement for a vehicle interior, the vehicle including a relatively soft, energy-absorbing, roof headliner, and a pillar extending downwardly from the vehicle roof to partially define a front door opening and a rear door opening, the energy absorbing arrangement comprising:

a molded hard-surfaced plastic interior trim panel secured to said vehicle pillar so as to face a vehicle interior space, said trim panel having an upper portion in edge contact with an exposed surface of said headliner, and a lower vertically extending portion; wherein the upper portion includes an impact absorbing surface, and said lower portion includes an impact absorbing surface, and the upper impact surface is inwardly offset from said lower impact surface toward an occupant of the vehicle to form an upper protuberance in the trim panel extending to the headliner as a smooth continuation of said headliner exposed surface.

2. The arrangement of claim 1, wherein the inward offset between said upper impact surface and said lower impact surface is approximately ten millimeters.

3. The arrangement of claim 1, wherein said upper impact surface has a length of approximately seventy millimeters.

* * * * *